United States Patent
Rudigier-Voigt et al.

(10) Patent No.: US 11,130,275 B2
(45) Date of Patent: Sep. 28, 2021

(54) METHOD AND APPARATUS FOR EMBOSSING A PATTERN ON A SUBSTRATE COATED WITH A VARNISH

(71) Applicant: SCHOTT AG, Mainz (DE)

(72) Inventors: Eveline Rudigier-Voigt, Mainz (DE); Matthias Bockmeyer, Mainz (DE); Jörn Gerban, Budenheim (DE); Claudia Stolz, Ingelheim (DE)

(73) Assignee: SCHOTT AG, Mainz (DE)

( * ) Notice: Subject to any disclaimer, the term of this patent is extended or adjusted under 35 U.S.C. 154(b) by 796 days.

(21) Appl. No.: 15/006,209

(22) Filed: Jan. 26, 2016

(65) Prior Publication Data

US 2016/0136874 A1 May 19, 2016

Related U.S. Application Data

(63) Continuation of application No. PCT/EP2014/064961, filed on Jul. 11, 2014.

(30) Foreign Application Priority Data

Jul. 24, 2013 (DE) .......................... 102013107909.1

(51) Int. Cl.
*B29C 59/04* (2006.01)
*C03C 17/00* (2006.01)
*C03C 17/30* (2006.01)
*C03C 19/00* (2006.01)
*B29C 35/08* (2006.01)
(Continued)

(52) U.S. Cl.
CPC ........ *B29C 59/046* (2013.01); *B29C 35/0805* (2013.01); *C03C 17/002* (2013.01); *C03C 17/30* (2013.01); *C03C 19/00* (2013.01); *B29C 59/026* (2013.01); *B29C 2035/0822* (2013.01); *B29C 2035/0827* (2013.01); *B29K 2083/00* (2013.01); *C03C 2218/113* (2013.01)

(58) Field of Classification Search
CPC ...... B29C 59/026; B29C 59/046; B29C 59/04
See application file for complete search history.

(56) References Cited

U.S. PATENT DOCUMENTS 2,737,764 A * 3/1956 Clyde ....................... B65B 9/02
53/433
2005/0212182 A1 9/2005 Yokoyama et al.
2009/0061116 A1 3/2009 Yokoyama et al.
(Continued)

FOREIGN PATENT DOCUMENTS

DE 102006004644 B4 12/2007
WO 0152299 A2 7/2001
(Continued)

OTHER PUBLICATIONS

English translation of International Search Report dated Sep. 23, 2014 for corresponding PCT/EP2014/064961, 3 pages.
(Continued)

*Primary Examiner* — Nathan H Empie
(74) *Attorney, Agent, or Firm* — Ohlandt, Greeley, Ruggiero & Perle, L.L.P.

(57) ABSTRACT

A method and an apparatus for embossing a pattern into a varnish on a sheet-like substrate are provided. The method applies a planar stamp using a roller, while the apparatus includes a roller having a planar stamp.

16 Claims, 2 Drawing Sheets

(51) Int. Cl.
B29C 59/02 (2006.01)
B29K 83/00 (2006.01)

(56) References Cited

U.S. PATENT DOCUMENTS

2015/0079354 A1  3/2015  Sakamoto et al.
2015/0191392 A1  7/2015  Henze et al.

FOREIGN PATENT DOCUMENTS

WO    2005003822 A1    1/2005
WO    2011085997 A1    7/2011
WO    2013176146 A1    11/2013

OTHER PUBLICATIONS

English translation of Written Opinion of the International Searching Authority dated Sep. 23, 2014 for corresponding PCT/EP2014/064961, 5 pages.
English translation of International Preliminary Report on Patentability dated Jan. 26, 2016 for corresponding PCT/EP2014/064961, 6 pages.

* cited by examiner

METHOD AND APPARATUS FOR EMBOSSING A PATTERN ON A SUBSTRATE COATED WITH A VARNISH

CROSS REFERENCE TO RELATED APPLICATIONS

This application is a continuation of International Application No. PCT/EP2014/064961 filed Jul. 11, 2014, which claims benefit under 35 U.S.C. § 119(a) of German Application No. 10 2013 107 909.1 filed Jul. 24, 2013, the entire contents of all of which are incorporated herein by reference.

BACKGROUND OF THE INVENTION

1. Field of the Invention

The invention relates to a method and an apparatus for embossing a pattern on a sheet-like substrate coated with a varnish. More particularly the invention relates to embossing patterns on glass or glass ceramic sheets which are coated with a curable polysiloxane or sol-gel varnish system.

2. Description of Related Art

Methods for introducing patterns on glass or glass ceramic substrates which are coated with a sol-gel varnish system or a polysiloxane varnish are known.

Document WO 2011/085997 A1 discloses embossing of a pattern by means of a planar stamp on a glass or glass ceramic substrate.

In this case, a varnish system curable by UV light is applied. Then, a stamp having the desired pattern is pressed on the varnish. The varnish system comprises a component which is curable by UV radiation and is cured by radiation transmitted through the stamp, i.e. polymerization of the varnish starts.

This causes the varnish system to be pre-cured at least to such an extent that the pattern retains its shape after the stamp has been pulled off. The varnish can then be cured in further processing steps, for example by heat in a range from 150° C. to 800° C. to obtain its ultimate strength. In particular, it is intended to burn off organic components of the varnish in this final curing step. This applies in particular to curing temperatures of more than 300° C.

The applied pattern may serve for visual appearance of the composite material so produced. For example, in combination with another layer it is possible to produce composite materials which have the appearance of a brushed stainless steel surface.

However, patterning for haptic features such as to obtain a gripping surface are also conceivable.

Equally feasible is the manufacturing of optical components such as diffractive optical elements, e.g. gratings and the like, or refractive elements, e.g. light guiding patterns and the like.

A problem with such known methods is that air bubbles may be produced. Furthermore, when applying the stamp, a non-homogeneous layer thickness distribution may result, in particular due to different contact pressure forces, thereby causing defects in the patterned layer. Such different contact pressure forces may especially be caused by unevenness of the substrate to be embossed.

Furthermore, it may happen that the employed polymer stamps do not remain dimensionally stable, for example experience elongation, which also leads to defects or inaccurate transfer of the pattern from the master to the varnish.

Document DE 10 2006 004 644 B4 discloses a method in which a stencil web is moved over the substrate by means of two rollers, similar to a tracked vehicle. The curable material applied on the substrate is cured through the stencil web by means of a UV lamp.

This procedure, too, causes defects in the pattern, at least in case of highly viscous sol-gel or polysiloxane-based varnishes, since the pattern might be blurred due to the movement and due to the length of the stencil web.

Also known from practice of applying are thermal nanoimprint lithography, step-and-flash imprint lithography, photolithography, and electron or ion beam lithography. All these methods have in common to enable to apply micropatterns on substrates with relatively high precision. However, because of the necessary processing steps and also because of the equipment employed for this purpose these methods are expensive and usually unsuitable for large substrates.

SUMMARY

Therefore, the invention is based on the object to provide a method and an apparatus which permit to easily pattern, by means of a stamp, varnish systems applied to a sheet-like substrate, while eliminating the risk of defects or inclusion of bubbles in the pattern. In particular, it should be possible to pattern substrates having even large surface areas, in particular greater than 25 cm, at high speed, i.e. with high throughput in the apparatus.

The object of the invention is already achieved by a method and an apparatus for embossing a pattern on a sheet-like substrate coated with a varnish as disclosed herein.

The invention relates to a method for embossing a pattern on a sheet-like substrate coated with a varnish.

The invention in particular relates to glass or glass ceramic sheets which are coated with a polysiloxane varnish or a sol-gel-based varnish.

The method is particularly used for coating sheets such as those used for building glazing, as cover glazing for photovoltaic modules, for kitchen appliances, or for optical applications, for example.

The embossed pattern may solely be intended to provide a specific visual appearance of the composite material so produced, but may also improve the optical properties of the composite material, especially if it is transparent, in particular with regard to an injection or emittance of light, or may basically provide for optical features on simple substrates.

According to the invention, a planar stamp is applied to the substrate, which stamp is fixed on one side of the substrate and is lowered until contacting the substrate in a direction towards another side of the substrate by means of a roller.

Thus, the stamp in form of sheet material is fixed at one end relative to the substrate, i.e. either attached to the substrate or to the apparatus on which the substrate is supported, and is rolled onto the substrate by means of a roller.

Then, the stamp may rest on the substrate. If appropriate, it is fixed by a bracket so as to avoid slipping.

While the stamp is resting on the substrate, the stamp is able to emboss a pattern into the varnish provided on the substrate.

By the application of the stamp by being lowered until contacting the substrate in combination with being fixed at one end, a flow front is formed during the application, whereby inclusions of air are largely avoided.

The substrate preferably rests horizontally on a support plate.

The stamp is preferably greater than the substrate or the area to be patterned on the substrate. According to one option for applying the stamp, the stamp is first applied in a front region of the substrate. Then the stamp is lowered from above and at the same time pressed onto the substrate by a roller with an advancing movement. This ensures that the stamp does not shift or slip during the further applying process.

According to another embodiment, the stamp is applied in front of the surface to be patterned and is progressively contacted with the varnish, while being bent around the roller, at least partially.

In a preferred embodiment of the invention, the angle between the stamp area not yet applied and the substrate is more than 45°, preferably more than 75°, and more preferably more than 80°. This improves the generation of a flow front during the complete application of the stamp.

According to the invention, application rates of more than 5 mm/s, preferably more than 30 mm/s, and most preferably more than 50 mm/s are possible. In particular, stamp application rate is between 5 mm/s and 500 mm/s, preferably between 15 mm/s and 250 mm/s, and more preferably between 25 mm/s and 100 mm/s.

Once placed, the stamp preferably is at rest for at least 0.1 to 10 seconds, and the varnish is cured by light or by heat until the pattern is stable.

Preferably, curing is effected by radiation transmitted through the stamp, in particular by UV light.

It will be understood that further curing steps may be performed subsequently, in particular thermal curing steps.

Furthermore, it is conceivable to pre-dry the varnish prior to the embossing, in order to expel any solvent that is still present on the one hand, or to slightly pre-polymerize the varnish, in particular by means of an infrared line emitter or by a short UV treatment. Other means/ways for pre-drying are known in the art. For example, it is possible in this way to remove solvents from the varnish, at least partially.

The curing through the stamp may in particular be performed directly after application thereof. For this purpose, for example, a radiation source, in particular a line emitter may follow the roller with a time-shift and at the same or a slower speed.

In particular, a UV lamp may be used which emits ultraviolet radiation. The wavelength may in particular be between 270 and 405 nm.

In the range of wavelengths in which curing is effected, the stamp preferably has a transmittance of more than 50%, preferably more than 70%, and most preferably more than 85%.

After curing, the stamp is lifted from the substrate. This step is also referred to as demolding.

Preferably, the pulling off is effected in a direction opposite to the application direction. Surprisingly, it has been found that in this manner deformations of the embossed pattern are largely avoided.

However, the stamp may likewise be pulled off in the direction of application.

When being lifted, the path of the stamp preferably corresponds to a reverse application process. The lifting process may be accomplished without contact to the pressure roller.

The lifting rate is preferably the same, more preferably 1.5 times, most preferably 2 times that of the application operation.

Thus, the invention relates to a step-and-repeat method in which the stamp is firmly clamped in the apparatus.

It has been found that the stamp can be used for at least 1,000 embossing operations without cleaning and maintenance steps.

As a material for the stamp, in particular a polymer can be used, preferably a silicone, in particular a two-component silicone rubber. This material can be cast and vulcanized at room temperature and exhibits high tear strength.

Use of a polyolefin elastomer is also conceivable.

In a preferred embodiment of the invention, the varnish has a viscosity of more than 500 mPa·s in its non-cured condition, i.e. in the condition in which the embossing operation takes place.

Preferably, viscosity is between 600 and 1500 mPa·s, more preferably between 800 and 1100 mPa·s.

In particular, in case of sol-gel-based varnishes it is necessary to pre-dry the varnish before embossing the pattern, in order to adjust the desired viscosity.

For this purpose, infrared radiation sources may be used, for example.

This may for instance be effected by passing the coated substrate with the solvent-containing varnish below the radiation source, at a rate from 1 to 30 mm/s, more preferably at a rate from 5 to 25 mm/s.

The power output of the infrared module, based on the length of the radiation source, may be from 15 to 100 W/cm, most preferably from 60 to 80 W/cm.

The line width of an infrared line emitter is preferably from 5 to 30 mm, more preferably from 15 to 20 mm. The radiation source is preferably spaced from the substrate by a distance from 50 to 60 mm.

The peak of emitted wavelengths of the infrared emitter is preferably between 750 nm and 5 µm, more preferably a short-wave infrared radiation with a wavelength from 2,000 to 2,200 nm is used. An infrared emitter with a housing, most preferably with a focusing reflector housing is used.

For curing the varnish, it is as well conceivable to use an IR emitter array consisting of a plurality of line emitters, which covers at least the same surface area as the substrate.

In this case the substrate may be pre-dried statically over its entire surface, as well as in a continuous mode, using the power outputs as mentioned above.

When curing using UV radiation, a line emitter with a reflector is preferably used, which may have a line width from 5 to 20 mm, preferably from 10 to 15 mm.

The wavelength of the UV light is preferably between 200 and 400 nm.

Depending on the varnish used, it is also possible to employ a mercury lamp with an intensity peak between 250 and 350 nm.

Depending on the varnish system used, emitters with other intensity peaks may also be used, for example at 300±20 nm, or 370±10 nm, which is in particular provided by iron-doped mercury lamps.

Also, a plasma-based UV lamp may be used, which allows for rapid switching on and off of the lamp as well as constant power output throughout the lifetime of the lamp. UV LED arrays with wavelengths of 385 nm and 395 nm may also be used for curing, whereby the heat input into the substrate, the varnish, and into the stamp during the curing process is reduced.

The curing step is preferably performed with a time delay to the application of the stamp, in particular from 0.1 s to 100 s, preferably from 0.3 s to 10 s, most preferably with a time offset from 0.5 to 5 s.

The curing area or the curing front produced by the radiation emitter is preferably substantially in parallel to the main extension direction of the roller.

The ratio of application rate to curing rate may range from 20:1 to 5:1.5.

The velocity of the lamp for curing may be between 1 and 100 mm/s, preferably between 3 and 30 mm/s, and most preferably between 5 and 20 mm/s.

It is as well conceivable to already partially cure the varnish by means of UV prior to the embossing operation.

Furthermore, it is conceivable to additionally perform light-based curing through the substrate, provided that the substrate is transparent to the employed radiation.

The rate at which the stamp is lifted is preferably from 10 to 100 mm/s.

The total dwell time of the substrate in the apparatus, i.e. for applying the stamp and UV irradiation, is preferably between 1 and 500 s, more preferably between 10 and 250 s, and most preferably between 15 and 100 s.

In particular substrates are coated which have a size between 0.001 and 5 m$^2$, preferably between 0.04 and 1 m$^2$. Operation may be performed in so-called "single piece flow", i.e. one substrate per embossing process, as well as in "multi piece flow", i.e. a plurality of substrates per embossing process. Furthermore, it should be noted that both final sizes and storage sizes that are cut to the final size at a later time, may be embossed.

According to a refinement of the invention, the roller is actively driven during application. That means the roller is not simply entrained to rotate during the application, but is provided with an own drive. It has been found that in this manner deformation of the stamp can be largely avoided.

In particular, it is possible to drive the roller such that the peripheral speed of the roller is different from the application rate at which the stamp is applied.

The roller may in particular be rotated at a lower peripheral speed than the application rate, whereby any elongation of the stamp may be compensated for and better pattern fidelity is preserved.

The invention further relates to an apparatus for embossing a pattern on a sheet-like substrate coated with a varnish, in particular by a method as described above.

The apparatus includes a table for supporting the substrate, a planar stamp, which is fixable or fixed at one end relative to the table, and a roller by means of which the stamp can be applied onto the substrate.

This is in particular an apparatus adapted to process sheet-like substrates in a step-and-repeat process.

For this purpose, the table is preferably displaceable for feeding substrates to the apparatus. To cover different substrate sizes and thicknesses, different inserts are conceivable for this table. Substrates in a range from 0.005 mm-50 mm can be patterned. Furthermore, in a particular embodiment the table may be equipped with a fixture for simultaneously embossing a plurality of final sizes (multi-piece flow).

Thus, the substrate is fed into the apparatus on the table, the stamp is applied, the varnish is cured, and the stamp is pulled off.

During application and curing, the table is locally fixed and the substrate rests on the table.

Only when the stamp has been lifted, the substrate on the table is moved out of the apparatus and may then be subjected to further processing steps, in particular a thermal curing process.

The roller used for applying the stamp is preferably configured so as to be replaceable, in particular in order to be able to use different rollers depending on the stamp or varnish that is employed, in particular rollers having a different weight and/or different diameter and/or made of a different material, depending on the stamp material chosen.

With respect to the latter, in particular the coefficient of friction of the roller and the stamp has to be taken into account. It is important to ensure that the coefficient of static friction takes a value such that any slippage of the stamp relative to the roller is prevented during the application process. This is particularly the case when the coefficient of static friction is at least 0.4.

In a particular embodiment of the apparatus, the latter is combined with an upstream coating apparatus, so that in particular with application of the stamp and UV curing at the same time, a very high throughput and minimized processing time in the sense of an inline production is achieved.

DETAILED DESCRIPTION

The subject matter of the invention will now be described by way of the drawings of FIGS. 1 to 3 with reference to an exemplary embodiment schematically illustrated therein.

Figure 1:
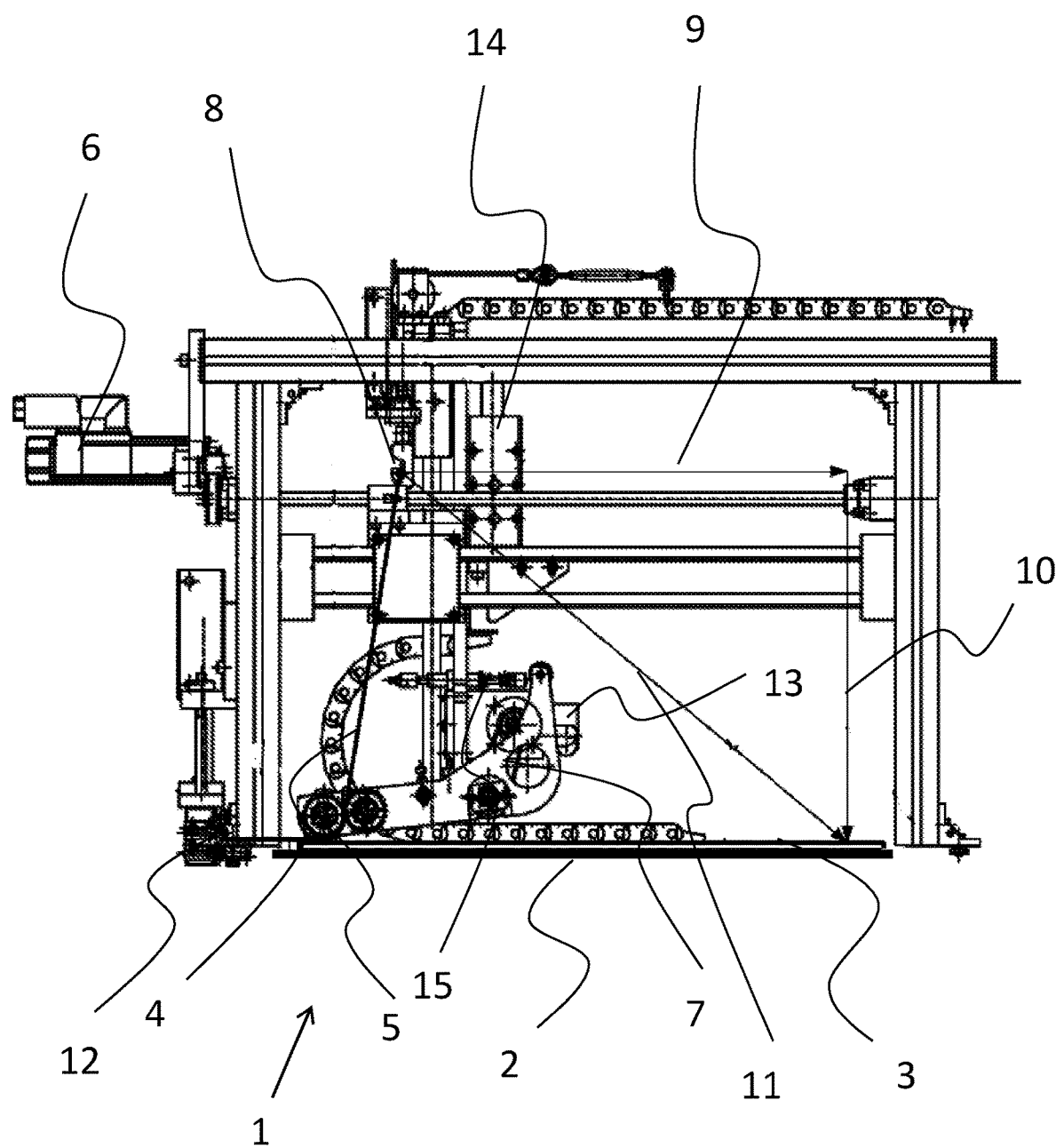
FIG. 1 schematically illustrates a side view of an apparatus for embossing a pattern.

FIG. 1 schematically illustrates a side view of an apparatus 1 for embossing a pattern.

The apparatus comprises a table 2 which is configured to be displaceable and can be moved into the apparatus from the right in this view. Means for displacing a table are known to persons skilled in the art and are not illustrated.

A substrate 3, in particular in the form of a glass or glass ceramic sheet, rests on table 2 and is coated with a varnish (not shown).

For embossing a pattern, apparatus 1 comprises a planar, i.e. sheet-like stamp 4.

This view illustrates the position of stamp 4 at the start of the embossing operation.

Stamp 4 is fixed at one end by means of a stamp holder 12 as a stamp fixture. It may for instance be clamped or may have recesses into which engaging members of the stamp holder (not shown) engage.

During the embossing process, table 2 is locally fixed in the apparatus. Thus, stamp 4 is fixed at one end relative to substrate 3 by means of stamp holder 12.

The apparatus further comprises a roller 5 by means of which the stamp 4 may be applied onto the substrate 3.

For application of the entire surface of the sheet, a stamp holder 8 is provided which in this embodiment is equipped with a spring that allows for a movement of the stamp holder 8 in vertical direction.

During an embossing operation, roller 5 is advanced to the right, in the horizontal direction, by a drive 6 at an advance rate.

Stamp holder 8 is also moved to the right, in a manner so that the angle between the stamp surface area not yet applied and the substrate 3 remains constant during the application process.

Arrow 9 symbolizes the movement direction of the advancing roller to the right.

As the stamp is applied, stamp holder 8 is moved vertically downwards, in a movement direction symbolized by arrow 10.

The movement of the upper edge of stamp 4 resulting therefrom is symbolized by arrow 11, running in a straight line towards a right edge of substrate 3.

Roller 5 can be lifted by means of a lifting mechanism 14.

A UV lamp which follows the movement of the roller is not illustrated in this view.

Preferably, the varnish applied on substrate 3 is cured through stamp 4 once the stamp 4 has been applied.

Then, roller 5 is lifted by lifting mechanism 14 not shown in more detail here, and the stamp is lifted substantially in the opposite movement direction, i.e. opposite to arrow 11.

Then, substrate 3 may be retracted from the apparatus by means of table 2 and may be subjected to further processing steps.

Roller 5 is mounted on pivotable levers 7 which are connected to the apparatus or lifting mechanism 14 via a vibration damper 15.

Furthermore, the roller is driven by an active drive 13. The peripheral speed of roller 5 is adjustable by drive 13, in particular such that the peripheral speed might be slightly less than the application rate when applying the stamp 4.

Stamp 4 should be applied in a manner so that the angle of the not yet applied portion of stamp 4 (except for the portion that directly engages the roller) and the substrate 3 is more than 45°, preferably more than 75°.

Preferably, the roller has a diameter between 3 and 50 cm.

Details of the roller mechanism will now be explained with reference to FIG. 2 and FIG. 3 which are perspective views of components of the apparatus.

Figure 2:
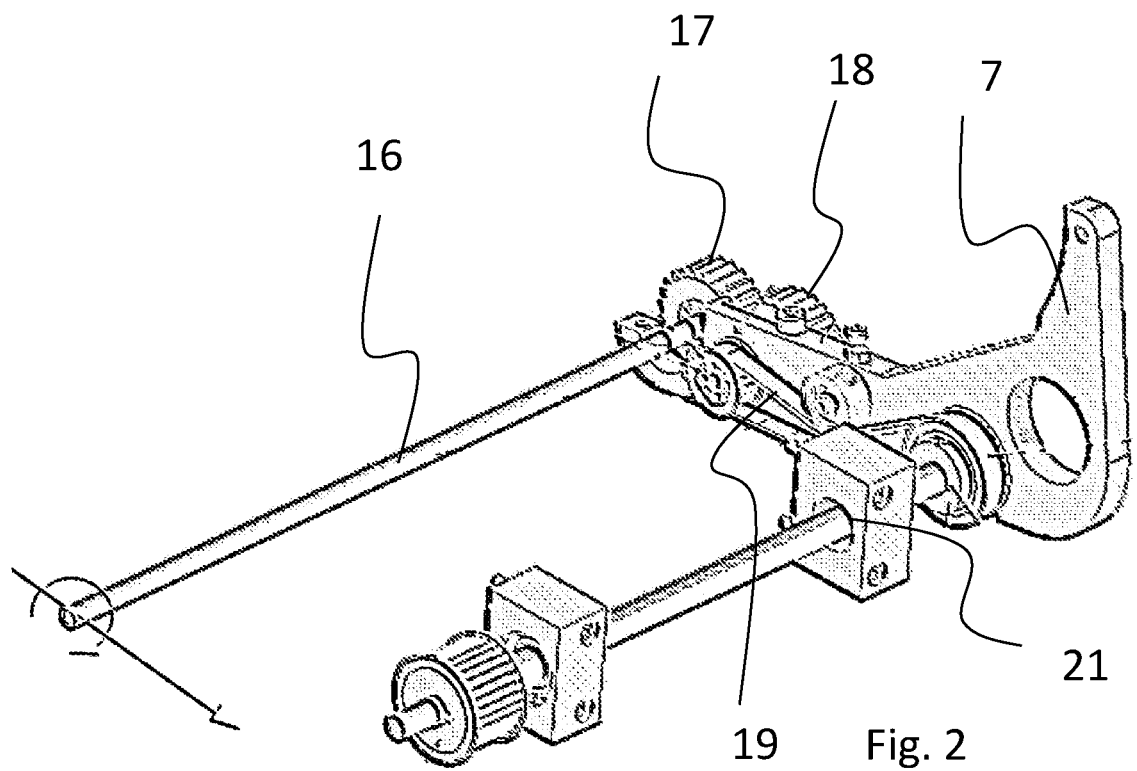
FIG. 2 is a perspective view of one of the two levers on which a roller is mounted.

FIG. 2 illustrates one of the two levers 7 on which the roller is mounted.

It shows the shaft 16 of the roller and gears 17 and 18 through which the roller is actively driven.

Moreover, a belt 19 can be seen, which serves to drive gear 18 by which the roller is driven through gear 17.

It goes without saying that the drive mechanism illustrated herein may as well be configured in any other manner.

Levers 7 are pivotally arranged on a bearing 21 so that roller 5 can be raised to be relieved when the stamp is lifted.

Figure 3:
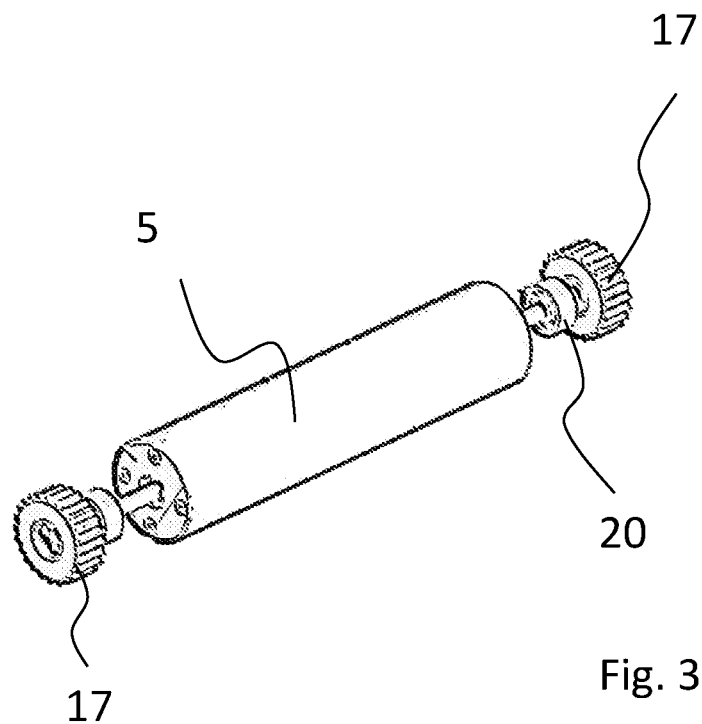
FIG. 3 is a perspective view of a roller with gears.

FIG. 3 shows roller 5 with gears 17.

Shaft 16 of roller 5 is mounted in ball bearings 20 which are inserted into the levers (7 in FIG. 2).

The invention permits patterning of highly viscous varnishes with high pattern fidelity, reduced number of defects, and high processing speed.

LIST OF REFERENCE NUMERALS

| | |
|---|---|
| 1 | Apparatus for embossing a pattern |
| 2 | Table |
| 3 | Substrate |
| 4 | Stamp |
| 5 | Roller |
| 6 | Drive |
| 7 | Lever |
| 8 | Stamp holder |
| 9 | Movement direction of advancing roller |
| 10 | Movement direction of stamp holder |
| 11 | Movement of stamp upper edge |
| 12 | Stamp holder |
| 13 | Active drive |
| 14 | Lifting mechanism |
| 15 | Vibration damper |
| 16 | Shaft |
| 17 | Gear |
| 18 | Gear |
| 19 | Belt |
| 20 | Ball bearing |
| 21 | Bearing |

What is claimed is:

1. A method for embossing a pattern on a substrate, comprising the steps of:

coating a substrate with a varnish;

applying a planar stamp onto the varnish on the substrate by lowering the planar stamp, which is fixed at one side of the substrate, into contact with the varnish on the substrate at an application rate in an application direction towards another side of the substrate by advancing a roller in the application direction at an advance rate, with a peripheral direction at the planar stamp opposite the application direction, and actively driving a peripheral speed of the roller in the application direction, whereby the planar stamp embosses a pattern into the substrate with the peripheral speed being lower than the application rate to compensate for elongation of the planar stamp;

curing the varnish by light or thermally until the pattern is dimensionally stable; and pulling off the planar stamp.

2. The method of claim 1, further comprising pulling the planar stamp off in a direction opposite to the application direction.

3. The method of claim 1, wherein the planar stamp corresponds at least to a size of a surface area of the substrate coated with the varnish or to be patterned.

4. The method of claim 1, wherein the step of applying the planar stamp onto the substrate comprises setting an angle between a stamp surface not yet applied and the substrate to more than 45°.

5. The method of claim 1, wherein the step of applying the planar stamp onto the substrate comprises setting an angle between a stamp surface not yet applied and the substrate to more than 80°.

6. The method of claim 1, wherein the step of applying the planar stamp onto the substrate comprises applying the planar stamp at an application rate of more than 5 mm/s.

7. The method of claim 1, wherein the step of applying the planar stamp onto the substrate comprises applying the planar stamp at an application rate of more than 50 mm/s.

8. The method of claim 1, further comprising driving a lamp so as to follow the roller, wherein curing step comprises activating the lamp to cure the varnish.

9. The method of claim 1, further comprising resting the planar stamp on the substrate for a period of at least 2 seconds after the application step.

10. The method of claim 1, wherein the step of coating the substrate with the varnish comprises coating with the varnish, in a non-cured condition, having a viscosity of more than 500 mPa·s.

11. The method of claim 1, wherein the step of coating the substrate with the varnish comprises coating with the varnish, in a non-cured condition, having a viscosity of between 800 and 1100 mPa·s.

12. A method for embossing a pattern on a substrate, comprising the steps of:

coating a substrate with a varnish;

applying a planar stamp onto the varnish on the substrate by lowering the planar stamp, which is fixed at one side of the substrate, into contact with varnish on the substrate at an application rate in an application direction towards another side of the substrate by advancing a roller in the application direction at an advance rate and with a peripheral direction at the planar stamp opposite the application direction;

driving the roller at a peripheral speed in the application direction that is lower than the application rate of the planar stamp to compensate for elongation of the planar stamp;

curing, through the planar stamp, the varnish until the pattern is dimensionally stable; and pulling off the planar stamp.

13. A method for embossing a pattern on a substrate, comprising the steps of:

coating a substrate with a varnish;

lowering a stamp, which is fixed at one side of the substrate, into contact with the varnish on the substrate towards another side of the substrate at an application rate by advancing a roller at an advance rate in an application direction and with a peripheral direction at the planar stamp opposite the application direction;

compensating for elongation of the stamp by driving the roller at a peripheral speed in the application direction that is lower than the application rate; and curing the varnish until the pattern is dimensionally stable.

14. The method of claim 13, wherein the step of curing the varnish until the pattern is dimensionally stable comprises curing through the stamp.

15. The method of claim 14, further comprising pulling off the stamp after the pattern is dimensionally stable.

16. The method of claim 13, further comprising pulling off the stamp after the pattern is dimensionally stable.

* * * * *